United States Patent [19]

Shuman

[11] Patent Number: 4,606,743
[45] Date of Patent: Aug. 19, 1986

[54] TWO STAGE ENGINE AIR BREATHER FILTER

[76] Inventor: Curtis F. Shuman, Rte. #2 Box 451, Tremonton, Utah 84337

[21] Appl. No.: 749,708

[22] Filed: Jun. 28, 1985

[51] Int. Cl.$^4$ .............................................. B01D 50/00
[52] U.S. Cl. ...................................... 55/323; 55/336; 55/337; 55/482; 55/521
[58] Field of Search ................. 55/321, 323, 332, 336, 55/337, 392, 394, 397, 398, 521

[56] References Cited

U.S. PATENT DOCUMENTS

| | | | |
|---|---|---|---|
| 2,171,248 | 8/1939 | Berkel | 55/392 |
| 2,230,453 | 2/1941 | Fitch | 183/8 |
| 2,534,171 | 12/1950 | Kirby | 55/336 |
| 3,046,718 | 7/1962 | Ide et al. | 55/323 |
| 3,508,383 | 4/1970 | Humbert et al. | 55/337 |
| 3,618,302 | 11/1971 | Cornett | 55/278 |
| 3,853,518 | 12/1974 | Tu et al. | 55/337 |
| 4,129,429 | 12/1978 | Humbert et al. | 55/484 |
| 4,198,726 | 4/1980 | Powell | 55/337 |
| 4,243,397 | 1/1981 | Tokar et al. | 55/487 |

FOREIGN PATENT DOCUMENTS

| | | | |
|---|---|---|---|
| 549921 | 12/1957 | Canada | 55/337 |
| 539795 | 9/1941 | United Kingdom | 55/323 |

*Primary Examiner*—Bernard Nozick
*Attorney, Agent, or Firm*—Donald J. Singer; Richard J. Donahue

[57] ABSTRACT

An air filter for removing particulate matter from an airstream by cyclonic action and having replaceable primary and secondary filter elements.

5 Claims, 1 Drawing Figure

U.S. Patent    Aug. 19, 1986    4,606,743
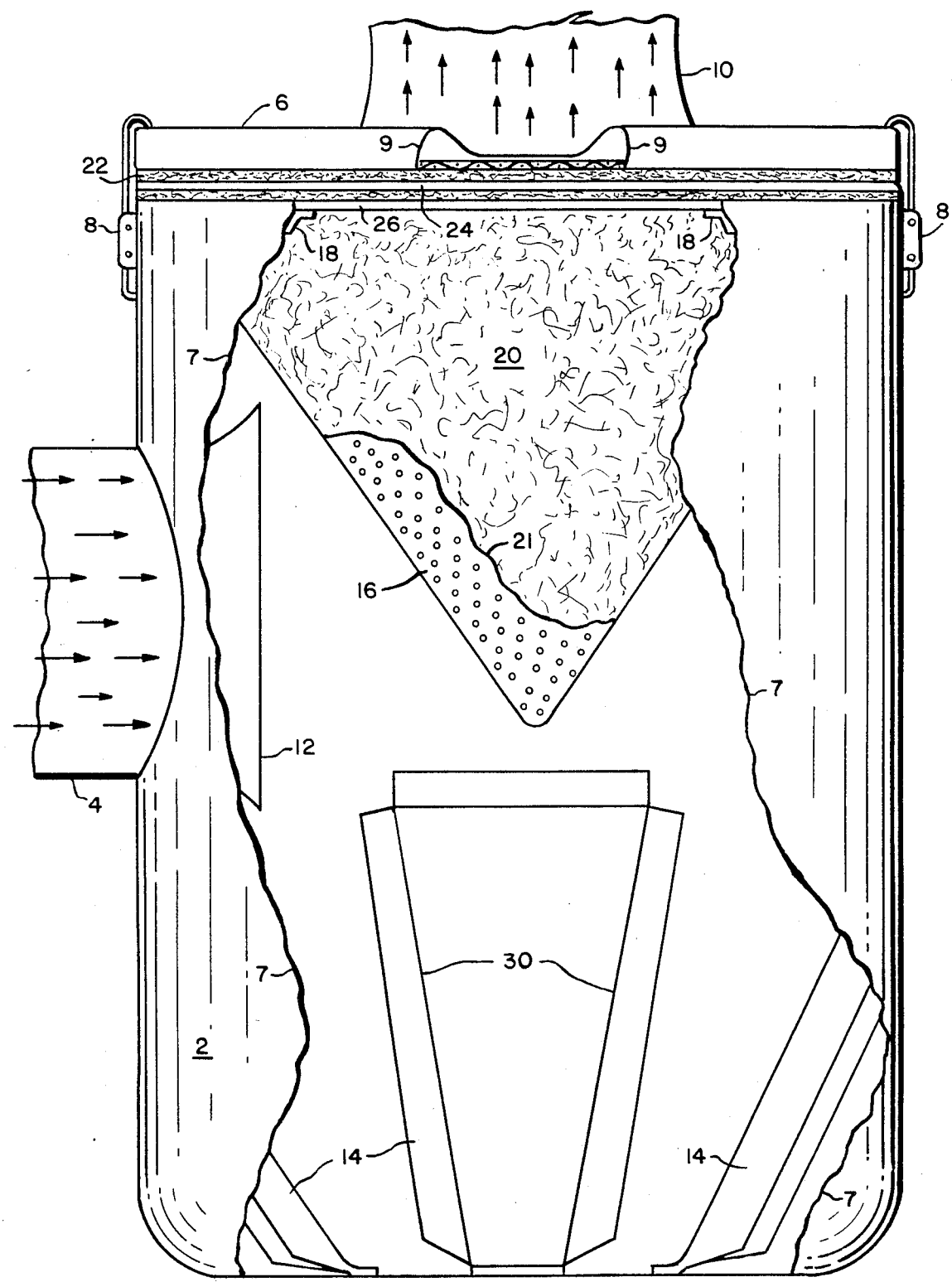

TWO STAGE ENGINE AIR BREATHER FILTER

STATEMENT OF GOVERNMENT INTEREST

The invention described herein may be manufactured and used by or for the Government for governmental purposes without the payment of any royalty thereon.

BACKGROUND OF THE INVENTION

This invention relates in general to air filters and particularly to an improved two stage air breather filter especially intended for use on large engines operated in a dirt and dust laden environment.

If particulate matter should enter the intake system of an engine, such as a highly sophisticated diesel engine, over a period of time it will cause serious damage and result in considerable down time. It is therefore, important to increase both the efficiency of the filter and its dirt separating capacity, while at the same time, not making the filter unduly complex and/or requiring the use of expensive filter elements.

Air breather filters of the type with which the present invention is concerned are disclosed in U.S. Pat. Nos. 2,230,453 and 3,508,383, 3,853,518 and 4,243,397.

U.S. Pat. No. 2,230,453 concerns an air filter of the liquid reservoir type wherein liquid from the reservoir is entrained in the incoming air, and such air is then successively passed through a double vortex cyclone chamber and a filter element. The term "double vortex cyclone" is used in this patent to designate a form of mechanical air-cleaning device which is composed of a conical casing open at its smaller lower end and provided at its larger upper end with an axial outlet and an outlying swirl-producing inlet. This structure compels the air flowing through the casing to form an outer vortex as it travels spirally from the inlet toward the smaller end and then to reverse its direction and form an inner vortex as it travels spirally toward the axial outlet.

While an air filter of the type disclosed in U.S. Pat. No. 2,230,453 may be effective in many applications, it is obviously of complex and expensive construction. Moreover, in many applications, it may not be desireable to introduce oil into the incoming air, as is the case with this device.

In U.S. Pat. No. 3,508,383, there is disclosed an air filter having a deflector as an end cap of the filter unit. A flange extending outwardly from the end cap is provided with blades which engage the housing and cause the air to swirl within the housing to thus separate the heavy dust particles from the air by the swirling action before the air passes through the filter media. This filter is also of complex construction having foraminous inner and outer tubes, utilizes a relatively expensive tubular pleated filter element, and does not have a second stage of particulate filtration.

U.S. Pat. No. 3,853,518 teaches an air filter having a vortex tube precleaner or a cyclone separator precleaner, and a dry filter element surrounding the inertial separator which acts as a final filter. The cyclonic action takes place within a conically-shaped separator formed within the filter casing.

U.S. Pat. No. 4,243,397 discloses a filter having a pleated filter element supported within a double wall cone. The pleated filter element, safety sleeve assembly and outer liner are meant to be sold in a replacement kit, while the inner metal liner is retained and reused during subsequent air cleaning operations.

Such prior art filters, while serving the basic purpose for which they were designed, are either of complex design and therefore expensive to fabricate, or do not have the filtering efficiency required in particularly harsh operating environments. Moreover, the cost for the replacement filter elements used in such prior art filters is expensive.

OBJECTS AND SUMMARY OF THE INVENTION

Accordingly, it is an object of the present invention to provide an air filter of simple construction and yet capable of providing a high degree of particulate filtration.

Another object of the present invention is to provide an air filter which is economical to manufacture and which efficiently and effectively removes a substantial amount of particulate matter in an airstream by cyclonic action while providing further cleansing of the airstream with inexpensive and easily replaced filter elements.

These and many other objects and advantages of the present invention will be readily apparent to those skilled in the pertinent art from the following detailed description of the preferred embodiment of the invention and the related drawing.

For a more complete understanding of the present invention and for other objects and advantages thereof, reference is now made to the following description taken in conjunction with the accompanying drawing, in which:

BRIEF DESCRIPTION OF THE DRAWING

The sole FIGURE of the drawing is a pictorial representation of the preferred embodiment of the air filter of the present invention, in which portions of the canister and cover have been cut away to expose interior elements of the filter.

DESCRIPTION OF THE PREFERRED EMBODIMENT

Referring now to the drawing, there is depicted therein an air filter embodying the concepts of the present invention. The air filter is provided with a cylindrical casing or canister 2 having an unfiltered air inlet 4 formed through the side wall thereof. The upper open end of canister 2 is secured to a cover 6 by retaining clips 8 and can be easily detached therefrom. A filtered air outlet 10 is axially positioned in cover 6. Portions of the canister 2 and cover 6 have been cut away in the drawing along the lines 7 and 9 respectively, in order to expose and facilitate the description of the interior construction of the filter.

An air deflector 12 is positioned within canister 2 at the point of entry of unfiltered air therein via air inlet 4. Air deflector 12 alters the direction of the unfiltered input air into a cyclonic path to swirl around the interior of canister 2. A plurality of spaced dirt collector baffles 14 are attached to the lower portion of the inner wall of canister 2.

A rigid cone-shaped screen 16 having a lip projecting from its base is supported at the upper end of canister 2 by an annular flange 18 which encircles the upper open end of canister 2. A cone-shaped primary filter cone 20, preferably formed of cellulose fiber material, is positioned over the exterior surface of screen 16. A portion of filter cone 20 has been cut away along line 21 in the drawing to provide a view of the underlying screen 16.

Filter cone 20 has a lip which is captured between the lip of screen 16 and flange 18 to retain the filter cone 20 in place.

A disk-shaped secondary filter pad 22 is positioned atop the open and inverted base of screen 16. Gasket material, such as ring gaskets 24 and 26 may be used to assure an air tight seal on both sides of the lip formed on filter cone 20.

A large mesh screen 28 is postioned over the open end of cover 6 to retain the secondary filter pad 22 at its desired location atop the base of, and enclosing the base of, primary filter cup 20.

Collector baffles 14 will be seen to be formed of wedge-shaped sheet metal having folds 30 therein to entrap particulate matter and cause the particulate matter to collect at the closed base of canister 2.

In operation, inlet air is deflected horizontally against the wall of canister 2 which, along with the shape of the primary filter cone 20, creates a cyclonic action. Centrifugal force exerted inside the canister throws dust particles which are heavier than air against the inside wall where they are caught by collector baffles 14 affixed to the wall. This action, along with the high and low pressure differential of this minature cyclone, prevents most of the dust particles from ever reaching the primary filter cone 20. Dust particles still in suspension are then separated from the air as it passes through two stages of filtration as the air is drawn by suction into an engine intake manifold. The first stage is the filter cone 20 with its rigid cone screen 16, and the second is filter pad 22 located at the inverted base of filter cone 20.

If, due to extremely dusty conditions, more than ordinary filtration is desired, it can easily be obtained by installing additional filter cones and/or pads. Effective filtration is realized at very small cost compared to the element replacement cost of conventional filters.

The cyclonic action is broken up by the collector baffles 14 but, besides this, the cyclonic action also is a filtering method in and of itself, because it causes high pressure on the top and low pressure on the bottom of the air flow. The low pressure cannot hold the dust particles and, thus, they tend to drop down on the collector baffles and on the inner base or floor of the canister 2.

While the present invention has been described in connection with a rather specific embodiment thereof, it will be understood that many modifications and variations will be readily apparent to those of ordinary skill in the art and that this application is intended to cover any adaptation or variation thereof. Therefore, it is manifestly intended that this invention be only limited by the claims and the equivalents thereof.

What is claimed is:

1. An air filter for filtering particulate matter from an airstream comprising:
    a cylindrical canister having an open upper end and a closed lower end forming a base;
    an unfiltered air inlet formed in the side wall of said canister;
    an air deflector disposed within said canister for directing the flow of air entering said canister via said unfiltered air inlet into a cyclonic path to swirl around the interior of said canister;
    a plurality of spaced collector baffles attached to the inner lower wall of said canister;
    a rigid cone-shaped screen supported in an inverted position by means in the open end of said canister;
    a cone-shaped primary filter element disposed over the exterior surface of said cone-shaped screen;
    a flat circular secondary filter pad covering the open base of said cone-shaped primary filter element; and
    a detachable cover member covering the open end of said canister and having a filtered air outlet formed therein.

2. An air filter as set forth in claim 1 and further comprising a flat circular metallic mesh screen disposed between said secondary filter pad and said detachable cover member.

3. An air filter as set forth in claim 2 wherein said primary filter element and said secondary filter pad are formed of cellulose fiber material.

4. An air filter as set forth in claim 3 wherein said plurality of spaced collector baffles comprise four of said baffles equally spaced around said inner lower wall of said canister.

5. An air filter as set forth in claim 4 wherein each of said baffles comprise a wedge-shaped sheet metal member having folds therein to entrap particulate matter between said member and said inner lower wall of said canister and to guide said particulate matter towards the base of said canister.

* * * * *